(12) United States Patent
Abeta

(10) Patent No.: US 8,019,392 B2
(45) Date of Patent: Sep. 13, 2011

(54) HANDSFREE APPARATUS AND HANDSFREE SYSTEM

(75) Inventor: Takehiro Abeta, Anjo (JP)

(73) Assignee: Denso Corporation, Kariya (JP)

( * ) Notice: Subject to any disclaimer, the term of this patent is extended or adjusted under 35 U.S.C. 154(b) by 401 days.

(21) Appl. No.: 12/283,905

(22) Filed: Sep. 16, 2008

(65) Prior Publication Data

US 2009/0082070 A1    Mar. 26, 2009

(30) Foreign Application Priority Data

Sep. 21, 2007  (JP) .................................. 2007-245655

(51) Int. Cl.
    *H04M 1/00*   (2006.01)
(52) U.S. Cl. ............... 455/569.1; 455/575.9; 455/569.2; 455/41.1; 455/41.2; 455/41.3
(58) Field of Classification Search .............. 455/575.9, 455/569.1, 569.2, 41.1–41.3
    See application file for complete search history.

(56) References Cited

U.S. PATENT DOCUMENTS

| 2004/0029552 A1* | 2/2004 | Miki et al. ..................... 455/344 |
| 2006/0168627 A1* | 7/2006 | Zeinstra et al. ................. 725/75 |
| 2009/0305633 A1* | 12/2009 | Warsta ......................... 455/41.2 |

FOREIGN PATENT DOCUMENTS

| JP | 8-272742 | 10/1996 |
| JP | 10-11385 | 1/1998 |
| JP | 11-184662 | 7/1999 |
| JP | 2001-312453 | 11/2001 |
| JP | 2002-368873 | 12/2002 |
| JP | 2005-341413 | 12/2005 |
| JP | 2006-186642 | 7/2006 |
| JP | 2007-034898 | 2/2007 |
| JP | 2007-074409 | 3/2007 |

OTHER PUBLICATIONS

Office Action dated Jun. 23, 2010 in Japanese Application No. 2007-245655.

* cited by examiner

*Primary Examiner* — Jinsong Hu
*Assistant Examiner* — Dung Hong
(74) *Attorney, Agent, or Firm* — Harness, Dickey & Pierce, PLC

(57) ABSTRACT

A handsfree system includes a handsfree apparatus and a phone. The handsfree apparatus has a database including a primary control program and a model-specific program. The primary control program enables the handsfree phone call when coupled with the phone. The model-specific program is operated to resolve a model-dependent constraint by being incorporated in the primary control program. The model-dependent constraint arises when coupled with the phone. The model-specific program is associated with phone model information and program specification information to specify the model-specific program independent of the phone model information. Phone model information and program specification information are acquired from a phone coupled with the handsfree apparatus. Model-specific program corresponding to the acquired program specification information is retrieved from the database when the acquired phone model information is not included in the database. The retrieved model-specific program is executed by incorporating in the primary control program.

7 Claims, 5 Drawing Sheets

| (i) NO. | (ii) MODEL NAME | (iii) PGM SP. INFO | (iv) MODEL-DEP. CONSTRAINT | (v) MODEL-SP. PGM |
|---|---|---|---|---|
| 1 | A11A, B11B | TYPE1 | REBOOT PRO. TIME 15 S (MODEL: PHONE BOOK READ-OUT ANOMALY) | TO WAIT TO SEND COMMAND FOR 15 S AT LEAST NEXT TO SENDING REBOOT COMMAND |
| 2 | B11B | TYPE2 | DEVICE DRIVER B | TO CHANGE TO DEVICE DRIVER B |
| 3 | C11C | TYPE3 | INTERRUPT 2ND OR SUBSEQUENT READ-OUT OF PHONE BOOK WHEN UNRELATED INFO RECEIVED (MODEL:2ND OR SUBSEQUENT PHONE BOOK READ-OUT ANOMALY) | TO NULLIFY UNRELATED INFO FOR 2ND OR SUBSEQUENT READ-OUT OF PHONE BOOK |
| 4 | D11D | | | |
| . | . | . | . | . |

| (i) NO. | (ii) MODEL NAME | (iii) PGM SP. INFO | (iv) MODEL-DEP. CONSTRAINT | (v) MODEL-SP. PGM |
|---|---|---|---|---|
| 1 | A11A, B11B | TYPE1 | REBOOT PRO. TIME 15 S (MODEL: PHONE BOOK READ-OUT ANOMALY) | TO WAIT TO SEND COMMAND FOR 15 S AT LEAST NEXT TO SENDING REBOOT COMMAND |
| 2 | B11B | TYPE2 | DEVICE DRIVER B | TO CHANGE TO DEVICE DRIVER B |
| 3 | C11C | TYPE3 | INTERRUPT 2ND OR SUBSEQUENT READ-OUT OF PHONE BOOK WHEN UNRELATED INFO RECEIVED (MODEL:2ND OR SUBSEQUENT PHONE BOOK READ-OUT ANOMALY) | TO NULLIFY UNRELATED INFO FOR 2ND OR SUBSEQUENT READ-OUT OF PHONE BOOK |
| 4 | D11D | ... | | ... |

HANDSFREE APPARATUS AND HANDSFREE SYSTEM

CROSS REFERENCE TO RELATED APPLICATION

This application is based on and incorporates herein by reference Japanese Patent Application No. 2007-245655 filed on Sep. 21, 2007.

FIELD OF THE INVENTION

The present invention relates to a handsfree apparatus and handsfree system.

BACKGROUND OF THE INVENTION

In recent years, a handsfree apparatus is spreading mainly in a vehicle. The handsfree apparatus enables a user to have a phone call without holding a handset or receiver. Requirements for a handsfree apparatus are, for instance, as follows:
  (i) to resolve a model-dependent constraint pertinent to a phone or phone model connected;
  (ii) to prevent resolution of the model-dependent constraint from exerting a bad influence on operation of other models; and
  (iii) to reduce user's burden.

In order to satisfy such a requirement, the following handsfree apparatus is developed. The apparatus includes a means to recognize the name of the model of a phone which is connected; and a means to correct the fault, if present, depending on the model of the phone connected (refer to Patent document 1).

Patent document 1: JP-2007-074409 A

The handsfree apparatus in Patent document 1 can perform an optimal operation meeting the model, if the cellular phone connected is distinguishable. When the handsfree apparatus contains a database associating models with corresponding faults, the database cannot memorize information pertinent to a phone or phone model which is put on sale after the handsfree apparatus was put on sale; thus, the handsfree apparatus cannot respond to the fault of the phone. The most recent information may be obtained from an information center or the like, if available. Naturally, building such a information center is necessary.

SUMMARY OF THE INVENTION

It is an object to provide a handsfree apparatus or hands free system capable of responding to a model-dependent constraint of a phone put on sale later than the handsfree apparatus.

According to an aspect of the present invention, a handsfree apparatus is provided as follows. The handsfree apparatus is coupled with a phone and allows a handsfree phone call via the phone. A storage medium is included to have a database including a primary control program and a model-specific program. Here, the primary control program is stored in a predetermined storage area for enabling the handsfree phone call when coupled with the phone; the model-specific program is stored separately from the primary control program and operated to resolve a model-dependent constraint by being incorporated in the primary control program; the model-dependent constraint arises when coupled with the phone; the model-specific program is associated with phone model information; and the model-specific program is associated with program specification information to specify the model-specific program independent of the phone model information. A phone information acquisition means is configured to acquire phone model information and program specification information when coupled with a phone. A model-specific program retrieval means is configured to retrieve model-specific program corresponding to the acquired program specification information from the database when the acquired phone model information is not included in the database. A program execution means is configured to execute the retrieved model-specific program by incorporating in the primary control program.

As another example of the present invention, a handsfree system is provided by including both the above handsfree apparatus and the phone coupled with the handsfree apparatus.

As another example of the present invention, a method is provided for resolving model-related constraint in the above handsfree system including the above handsfree apparatus and the phone coupled with the handsfree apparatus.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
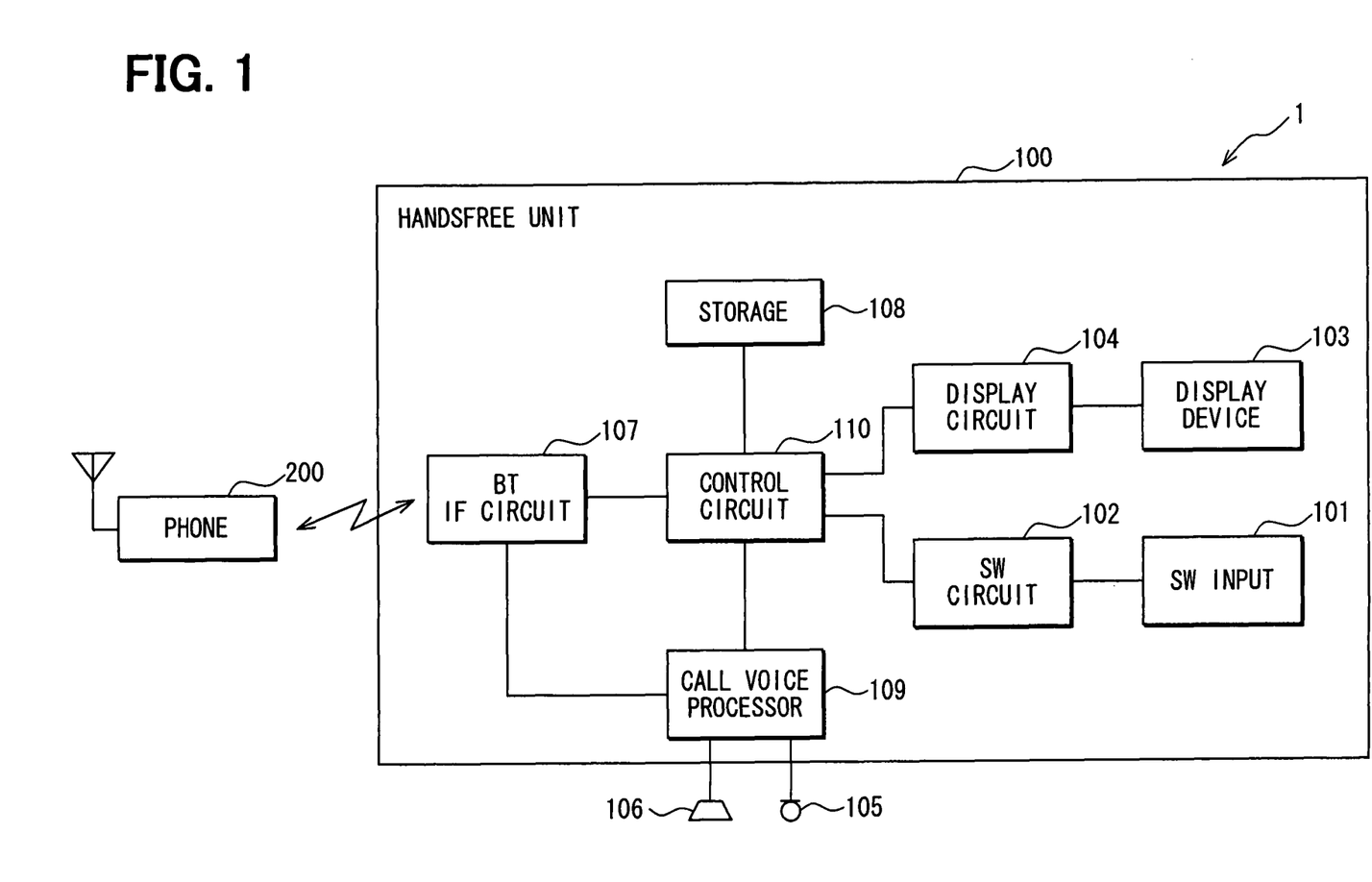
FIG. 1 is a block diagram illustrating a construction of a handsfree system according to an embodiment of the present invention.

Hereafter, a handsfree system or apparatus according to an embodiment of the present invention is explained with reference to the drawings. The handsfree system or apparatus is, for instance, mounted in a vehicle as an in-vehicle handsfree system or apparatus. As illustrated in FIG. 1, a handsfree system 1 includes a handsfree unit 100 (also referred to as a handsfree apparatus), which executes various processes for a handsfree phone call (or handsfree call), and a phone 200 such as a cellular phone. Herein, the phone 200 can be one of multiple phones coupled or connected with the handsfree unit 100 or used in the handsfree system 1; further, each phone can be classified with a (phone) model.

The handsfree unit 100 includes a switch input device 101 including a switch, a switching circuit 102 processing input signals from the switch input device 101, a display devices 103 such as an LCD (Liquid Crystal Display), a display circuit 104 driving the display device 103, a microphone 105, a speaker 106, a Bluetooth IF (interface) circuit 107 connecting the phone 200 and the handsfree unit 100 therebetween, a storage device 108, a call voice processor 109, and a control circuit 110 as a control device connected with the foregoing.

Figure 2:
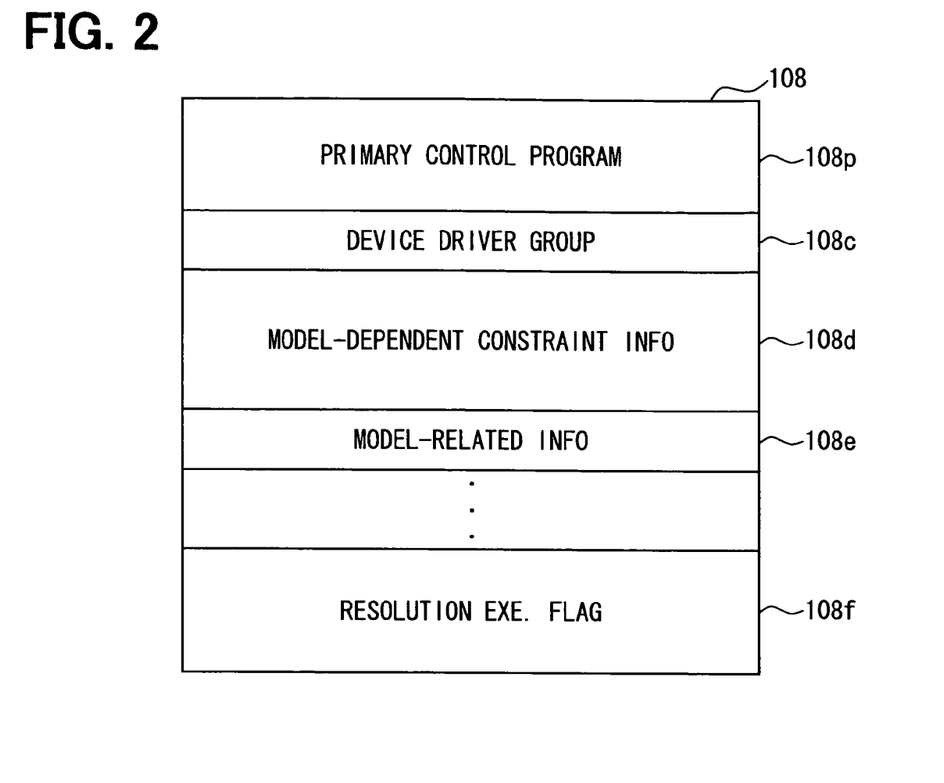
FIG. 2 is a diagram illustrating an example of memory contents in a storage device.

The storage device 108 includes a nonvolatile storage medium such as a flash memory. As shown in FIG. 2, the storage device 108 memorizes or stores a primary control program 108p for operating the handsfree unit 100, a device driver group 108c for data communications, model-dependent constraint information 108d, model-related information 108e, a model-dependent constraint resolution execution flag area 108f, and the like. Details of the foregoing are mentioned later.

The control circuit 110 is a known computer including a CPU, ROM, RAM, and peripherals. The CPU executes the primary control program 108p to thereby execute various processes for handsfree call. Herein, the control circuit 110 can function as an example of a model-specific program retrieval means or control unit, a program execution means or control unit, or a phone information registration means or control unit.

A reception voice signal received from a call partner via the phone 200 is inputted into the call voice processor 109 via the Bluetooth IF circuit 107. The call voice processor 109 applies a call voice process such as a volume adjustment process or a loudness compensation process to the inputted voice signal as needed, and outputs the processed voice signal to the speaker 106. The reception voice from the call partner can be thereby heard through the speaker 106.

In contrast, a transmission voice signal, which is to be transmitted to a call partner via the phone 200, is inputted via the microphone 105 to the call voice processor 109. The call voice processor 109 applies, to the inputted transmission voice signal, a call voice process such as an echo cancellation process for removing a voice component unnecessarily entering to the microphone 105 from the speaker 106, and outputs the processed transmission voice signal to the Bluetooth IF circuit 107. The transmission voice signal is then outputted from the Bluetooth IF circuit 107 to the phone 200. The transmission voice signal can be thereby transmitted to the call partner via the phone 200.

Thus, the handsfree phone call with the call partner can be executed via the phone 200. Herein, the Bluetooth IF circuit 107 can be function as an example of a phone information acquisition means or control unit. In addition, the communication protocol between the handsfree unit 100 and phone 200 can be another protocol or standard other than the Bluetooth communication protocol, like Patent document 1 directly connecting using a cradle or cable, and a connector.

When coupled or connected to the phone 200, the control circuit 110 reads telephone book data stored in the phone 200 and then memorizes the read data in the storage device 108. The telephone book data is thus available in the handsfree unit 100. The control circuit 110 displays the telephone book data stored in the storage device 108 on a display screen of the display device 103. For instance, a user selects a specific phone number from the displayed telephone book data via the switch input device 101. The control circuit 110 then executes a calling operation to output a call to a call partner having the selected specific phone number.

Further, the control circuit 110 executes a reception responding operation to notify the user that a call reception is made when the reception voice signal is received via the phone 200. The reception responding operation by the control circuit 110 is to output a ringing tone via the speaker 106, or to display, on the display screen of the display device 103, information on the call partner including the telephone number, the name, etc. by using the telephone book data stored in the storage device 108. Herein, the display device 103 or the speaker 106 can function as an example of a message output device or means.

In order to prevent the difference in the state the phone 200 from occurring between the actual state and the state the handsfree unit 100 recognizes, the control circuit 110 transmits a reboot command to the phone 200 after reading the telephone book data from the phone 200. The control circuit 110 then transmits another command, which is next to the reboot command, to the phone 200 after the phone 200 is rebooted or re-started by the reboot command.

Next, a model-dependent constraint is explained which arises depending on a (phone) model of a phone.

A first model-dependent constraint item is as follows.

(1) First Model-Dependent Constraint

For instance, a first model has a longer reboot processing time than other models and may receive a command next to the reboot command from the control circuit 110 irrespective of mid-processing of the reboot. As a result, the phone 200 may not appropriately execute either reception or transmission after the telephone book data is read out.

(2) Second Model-Dependent Constraint

A second model-dependent constraint item is as follows.

The storage device 108 of the handsfree unit 100 stores a device driver group 108c for data communications for executing data communication with the phone 200. The control circuit 110 can perform data communication with the phone 200 presently connected with a predetermined corresponding device driver stored in the storage device 108. A second model may not be allowed to perform data communication with the handsfree unit 100 by using the device driver presently stored or mounted in the storage device 108 of the handsfree unit 100.

(3) Third Model-Dependent Constraint

A third model-dependent constraint item is as follows. After completing or interrupting the first read-out of the telephone book data from the phone 200, the handsfree unit 100 may execute the second or subsequent read-out of the telephone book data. In such a case, the phone 200 may transmit information unrelated to the data transfer sequence of the telephone book data. A third model may not allow the second or subsequent read-out of the telephone book data when the second or subsequent read-out of the telephone book data is interrupted.

Figure 3:
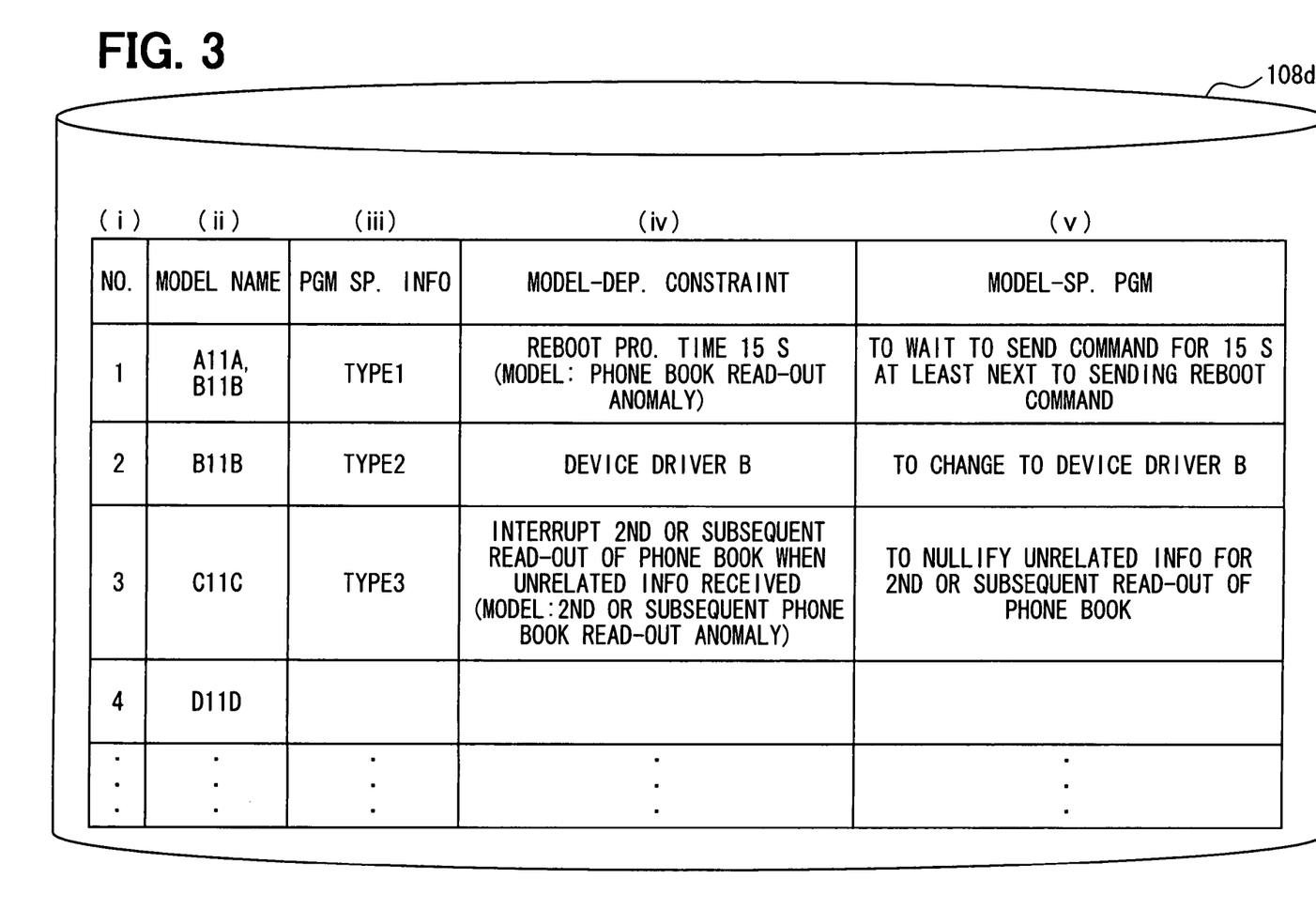
FIG. 3 is a diagram illustrating an example of data contents of model-dependent constraint information.

FIG. 3 illustrates an example of model-dependent constraint information 108d including and associating therebetween (phone) model names (A11A to D11D) of the phones 200, model-dependent constraint items, and model-specific programs. In FIG. 3, for easy understanding, the model-dependent constraint information 108d is illustrated as an association table. Herein, the model-dependent constraint information 108d may function as an example of a database.

In addition, program specification information corresponding to each model-dependent constraint item is also stored in the model-dependent constraint information 108d.

Herein, the model-dependent constraint includes three items, for instance. The models A11A and B11B have a first model-dependent constraint item. The first model-dependent constraint item is associated with TYPE 1 of program specification information.

The model-dependent constraint item pertinent to the models A11A and B11B can express that as opposed to other models C11C, D11D having a reboot processing time of a standard reboot processing time (for example, 1 second), the models A11A, B11B have a reboot processing time longer (15 seconds in FIG. 3) than the standard reboot processing time of the other models C11C, D11D, as illustrated in No. 1 in FIG. 3. Otherwise, the model-dependent constraint item may express that the model A11A, B11B has the first model-dependent constraint item causing a telephone book read-out anomaly.

The model B11B has a second model-dependent constraint item. The second model-dependent constraint item is associated with TYPE 2 of program specification information. The second model-dependent constraint item pertinent to the model B11B can express a device driver (i.e., the device driver B illustrated in No. 2 in FIG. 3) for data communications compliant with the model B11B and different from the device driver presently mounted.

Further, the model C11C has a third model-dependent constraint item. The third model-dependent constraint item is associated with TYPE 3 of program specification information. The third model-dependent constraint item pertinent to the model C11C can express interrupting the second or subsequent read-out of the telephone book data when data unrelated to data transfer is transmitted, as illustrated in No. 3 in FIG. 3. Otherwise, the model-dependent constraint item pertinent to the model C11C may express that the model C11C has the third model-dependent constraint item causing anomaly in the second or subsequent read-out of the telephone book data.

In addition, no model-dependent constraint item pertinent to the model D11D exists, as shown in No. 4 in FIG. 3.

Furthermore, the model-dependent constraint information 108d includes model-specific programs corresponding to the first, second, and third model-dependent constraint items. That is, the model-specific program corresponding to the model A11A, B11B (TYPE 1) is responding to the first model-dependent constraint item. The model-specific program corresponding to the first model-dependent constraint item executes the following process, in which with respect to the model A11A, B11B, a command subsequent to the reboot command is transmitted after waiting for a reboot processing time longer than the standard reboot processing time for other models.

Further, the model-specific program corresponding to the model B11B (TYPE 2) is responding to the second model-dependent constraint item. The model-specific program corresponding to the second model-dependent constraint item executes the following process in which, the device driver for data communications presently mounted is changed into a device driver meeting the model B11B (i.e., device driver B).

Further, the model-specific program corresponding to the model C11C (TYPE 3) is responding to the third model-dependent constraint item. The model-specific program corresponding to the third model-dependent constraint item executes the following process in which, with respect to the model C11C, when information unrelated to data transfer sequence of the telephone book data is sent from the phone 200 in the second or subsequent read-out of the telephone book data, the unrelated information is cancelled and the read-out of the telephone book data is executed or continued.

Herein, the model-specific program corresponding to the second model-dependent constraint item may alternatively execute the following process in which, with respect to the model C11C, when a previously investigated anomaly code unrelated to data transfer sequence of the telephone book data is sent from the phone 200 in the second or subsequent read-out of the telephone book data, the anomaly code is cancelled and the read-out of the telephone book data is executed or continued. In such a case, the control circuit 110 needs to obtain the information on the investigated anomaly code previously.

The above-mentioned model-specific program is, for instance, contained in a program module, and operated while being incorporated in the primary control program 108p. For example, the model-specific program is configured as a subroutine, a function, or a macro, and is called from the primary control program 108p and executed.

Figure 4:
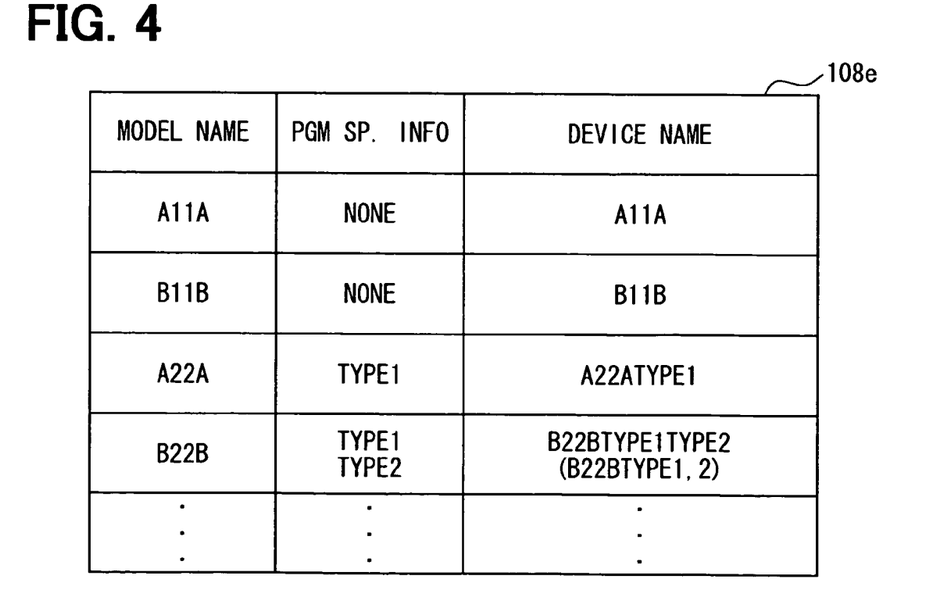
FIG. 4 is a diagram illustrating an example of data contents of model-related information.

As shown in FIG. 4, four phone models are assumed as a phone or a phone model coupled or connected with the handsfree unit 100. Here, A22A and B22B were not sold at the beginning of the sale of the handsfree unit 100; therefore, the model-dependent constraint information 108d in FIG. 3 does not include A22A and B22B. Furthermore, A22A has the same model-dependent constraint item (TYPE 1) as A11A; further, B22B has the same model-dependent constraint items (TYPE 1, TYPE 2) as B11B. In such a case, since there is no data (model name), which corresponds to the model-dependent constraint information 108d in FIG. 3, in a conventional technology, the model-specific program cannot be started.

To that end, the program specification information corresponding to the model-dependent constraint item illustrated in FIG. 3 is added to the device name registered in the phone 200 to thereby change the device name. That is, A22A is changed to A22ATYPE1 by adding TYPE 1 as an additional keyword. In addition, B22B is necessary to correspond to both TYPE 1 and TYPE 2 and, thus, is changed to B22BTYPE1TYPE2 or B22BTYPE1, 2. Such a change or update can be made when a new phone 200 is released after the handsfree unit 100 was put on sale. Information for the update can be released to the public such an Internet web to allow a user to personally change a device name. In addition, the change of the device name is made using a function already included in the phone 200 as follows.

Non-patent Document 1 describes a method where the device name of a phone can be designated or changed optionally. The configuration of the embodiment uses such an existing method as is. Further, the method functions as an example of a program specification information input means for inputting program specification information to specify a model-specific program.

Non-patent Document 1: Toshiba W44T Instruction manual (in Page 329)

When receiving phone information from the phone 200, the handsfree unit 100 stores the list in FIG. 4 as model-related information 108e in the storage device. Addition or update of the phone information is made when a model not registered in the model-related information 108e or when the phone information is different from that already registered even if the relevant model is already registered.

The control circuit 110 recognizes the model name from the device name of the phone 200 connected to the hands free unit 100 using a function recognizing model names. The control circuit 110 then searches the model-dependent constraint information 108d for a model-dependent constraint item corresponding to the recognized model.

Further, the control circuit 110 recognizes the program specification information from the device name of the phone 200 connected to the handsfree unit 100. The control circuit 110 then searches the model-dependent constraint information 108d for a model-dependent constraint item corresponding to the recognized keyword.

Furthermore, when detecting the model-dependent constraint item corresponding to the recognized model by the search of the model-dependent constraint information 108d, the control circuit 110 acquires a model-specific program for canceling or resolving the detected model-dependent constraint item from the model-dependent constraint information 108d. The acquired model-specific program is then executed.

Thereby, the control circuit 110 can promptly and appropriately resolve the model-dependent constraint item depending on the recognized model using the program specification information and the model-specific program within the model-dependent constraint information 108d.

Therefore, according to the present embodiment, the model-dependent constraint item depending on the recognized model is effectively cancelable by the control circuit 110 to execute the corresponding model-specific program. For instance, the above-mentioned first, second, and third model-dependent constraint items can be resolved effectively.

Hereafter, details are explained about the above-mentioned process. First, a model-specific program retrieval process is explained using FIG. 5. The present process is included in the primary control program 108p, and repeatedly executed along with other processes of the primary control program 108p.

Figure 5:
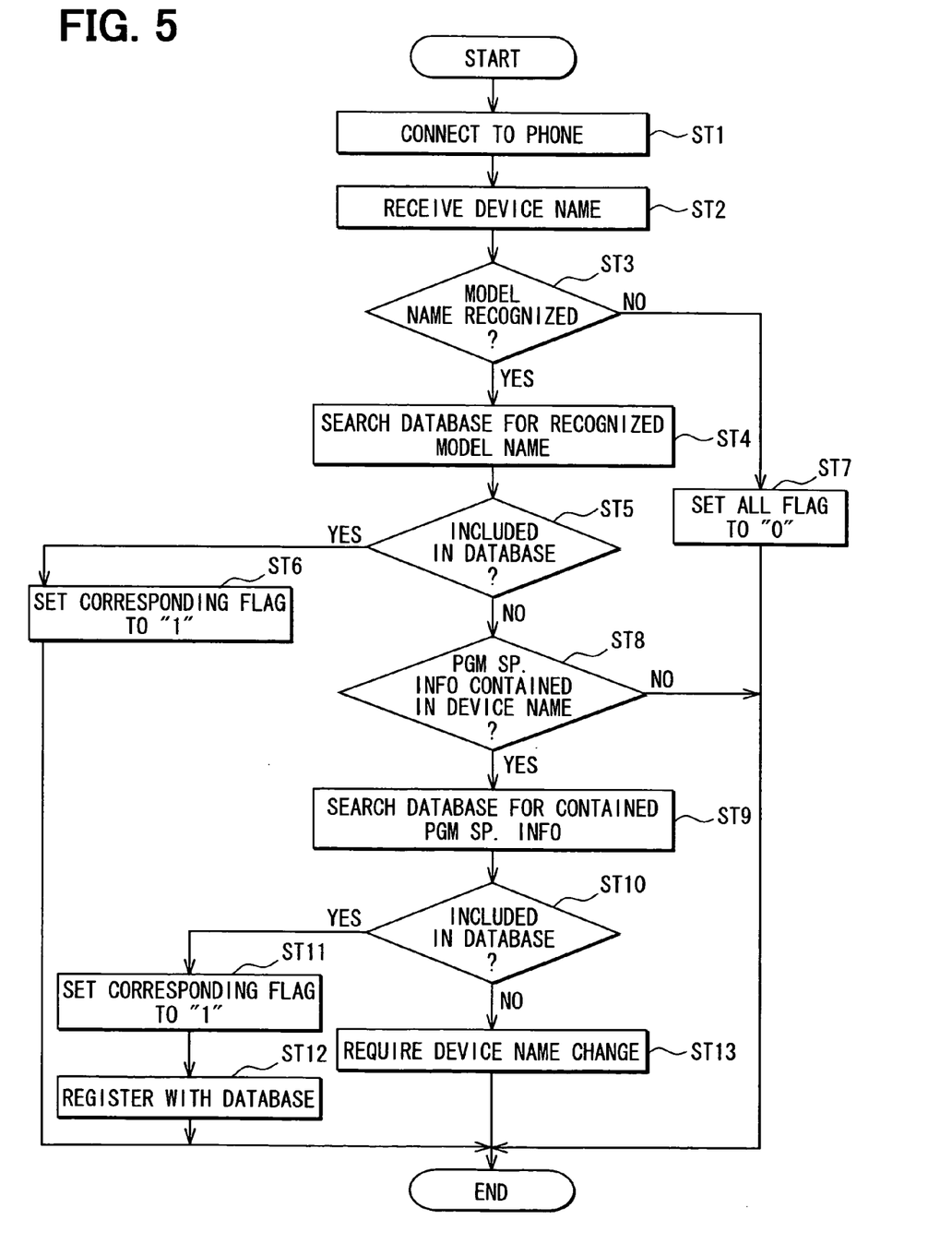
FIG. 5 is a flowchart explaining a retrieval process of a model-specific program.

The handsfree unit 100 or the control circuit 110 establishes a communication link or connection with the phone 200 via the Bluetooth IF circuit 107 (ST1). Then, phone information ("device name") is received and acquired via the Bluetooth IF circuit 107 (ST2). Subsequently, it is determined whether the model name of the phone 200 connected is recognized, i.e., whether the device name (phone information) is acquired. When the model name cannot be recognized (ST3: No), all flags for resolving the individual model-dependent constraint items are set to zero (0) (ST7). The present process is ended. That is, resolving model-dependent constraint items are canceled.

In addition, the flags for resolving the model-dependent constraint items are assigned with storage areas every number ((i) NO.) of the model-dependent constraint item (refer to FIG. 3).

In the meantime, when the model name is recognized (ST3: Yes), the model-dependent constraint information 108d (referred to as "database" in FIG. 5) is searched by regarding the model name as a retrieval key word (ST4). When the model name is included in the model-dependent constraint information 108d (ST5: Yes), the corresponding flag is set to one (1) (ST6).

When the model name is not included in the model-dependent constraint information 108d (ST5: No), it is determined whether program specification information is contained in the "device name" (phone information) (ST8). When any program specification information is not contained in the "device name" (ST8: No), the present process is ended. In such a case, the above-mentioned ST7 can be executed.

When program specification information is contained in the "device name" (ST8: Yes), the model-dependent constraint information 108d is searched with the program specification information regarded as a retrieval key word (ST9). When program specification information is contained in the model-dependent constraint information 108d (ST10: Yes), the flag for resolving the model-dependent constraint item corresponding to the program specification information is set to one (1) (ST11). In other words, resolving the model-dependent constraint item corresponding to the program specification information is executed.

Here, the phone information acquired presently is not stored in the model-dependent constraint information 108d, so the model name is subsequently registered into the database or the model-dependent constraint information 108d (ST12). For instance, the model A22A in FIG. 4 is registered subsequent to "B11B" in the storage area of "(ii) MODEL NAME" of NO. 1. Thereby, in the next or subsequent process, the model A22A is treated as a model registered in the model-dependent constraint information 108d. In the present process, at ST6, the corresponding flag is set to one (1), so the execution time of the process can be shortened.

In the meantime, the present process is ended when program specification information is not contained in the program specification information (ST10: No). Herein, the model name is not included in the model-dependent constraint information 108d, and the program specification information is not contained in the "device name." Therefore, a message urging a user to change "device name" or add program specification information to the "device name" is outputted via the display device 103 or the speaker 106 (ST13).

Figure 6:
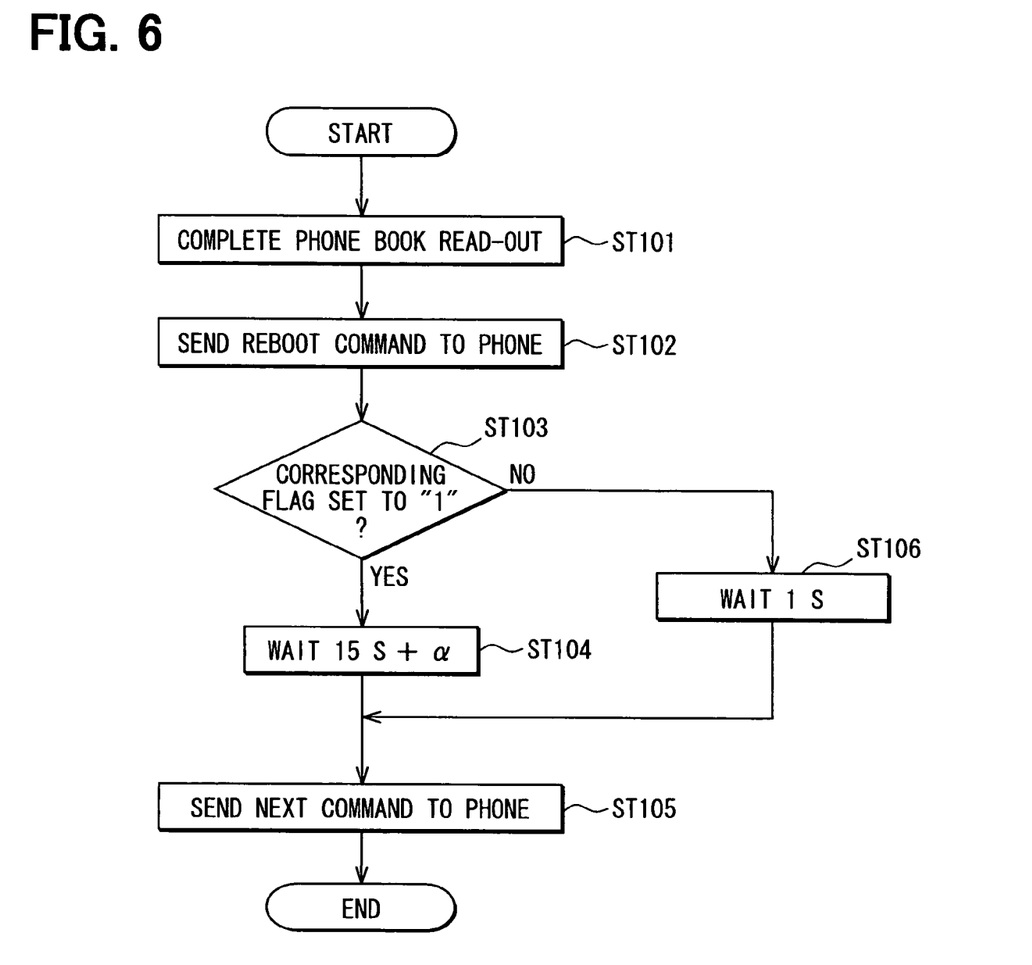
FIG. 6 is a flowchart explaining a resolution process of a model-dependent constraint.

Resolving the first model-dependent constraint item, which is indicated as NO. 1 in FIG. 3, is explained below with reference to FIG. 6. First, the handsfree unit 100 or the control circuit 110 completes read-out of the telephone book data from the phone 200 connected (ST101). The control circuit 110 transmits a reboot command to the phone 200 via the Bluetooth IF circuit 107 (ST102).

The control circuit 110 refers to the model-dependent constraint resolution flag area 108f in FIG. 2. It is then determined whether the model-dependent constraint resolution execution flag (the flag for resolving the model-dependent constraint item) corresponding to NO. 1 is set to one (1) in the model-specific program retrieval process. When the model-dependent constraint resolution execution flag is not set to 1 (ST103: No), the control circuit waits for one second which is the standard reboot processing time to pass (ST106).

When the model-dependent constraint resolution execution flag is set to 1 (ST103: Yes), With reference to the model-dependent constraint information 108d, the model-specific program corresponding to the relevant NO. 1 is called or incorporated, and executed. That is, the control circuit 110 waits for 15 seconds plus a as the reboot processing time for a recognized model by adding some time delay to 15 seconds, which is longer than one second of the standard reboot processing time (ST104). In addition, the time delay (+α) can be changed to a desired time more than zero second depending on the configuration of the system.

After waiting or standby, the control circuit 110 transmits a command next to the reboot command (ST105), and the present process is ended.

The above-mentioned operation can effectively resolve or cancel the first model-dependent constraint item depending on the recognized model.

In addition, the control circuit 110 can determine the necessity of execution for resolving the model-dependent constraint item simply based on the model-dependent constraint resolution execution flag, which is set by the control circuit 110 itself in regard of the telephone book read-out. Thus, the first model-dependent constraint item can be resolved promptly.

In addition, the second or third model-dependent constraint item can be resolved in a method similar to the above-mentioned method for the first model-dependent constraint item.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer. Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a handsfree apparatus is provided as follows. The handsfree apparatus is coupled with a phone and allows a handsfree phone call via the phone. A storage medium is included to have a database including a primary control program and a model-specific program. Here, the primary control program is stored in a predetermined storage area for enabling the handsfree phone call when coupled with the phone; the model-specific program is stored separately from the primary control program and operated to resolve a model-dependent constraint by being incorporated in the primary control program; the model-dependent constraint arises when coupled with the phone; the model-specific program is associated with phone model information; and the model-specific program is associated with program specification information to specify the model-specific program independent of the phone model information. A phone information acquisition means is configured to acquire phone model information and program specification information when coupled with a phone. A model-specific program retrieval means is configured to retrieve model-specific program corresponding to the acquired program specification information from the database when the acquired phone model information is not included in the database. A program execution means is configured to execute the retrieved model-specific program by incorporating in the primary control program.

It is noted that some phones have "device name ((phone) model information)" as means to distinguish each model name and "device name" can be changed by a user. In the above aspect of the present disclosure, a predetermined keyword is contained as program specification information; a corresponding model-specific program is executed based on the contained keyword. The handsfree apparatus can thus respond to an unknown phone or phone model without need of changing a built-in program.

As an optional aspect to the handsfree apparatus, the phone information acquisition means may be configured to acquire both the phone model information and the program specification information collectively; the model-specific program retrieval means may be configured to determine whether the acquired phone model information is included in the database; and the model-specific program retrieval means may be configured to retrieve the model-specific program corresponding to the acquired program specification information from the database when it is determined that the acquired phone model information is not included in the database.

Thus, when not complying with the model of a phone coupled or connected, the handsfree apparatus can use a model-specific program of another model. The model-dependent constraint pertinent to the unknown phone can be thereby resolved at least partially.

As an optional aspect to the handsfree apparatus, a phone information registration means may be further included to register, with the database, phone information including the acquired phone model information when the acquired model information is not included in the database.

The model information of a new certain phone is thus memorized or accumulated in the database. When a phone of the identical model is subsequently connected, the corresponding model-specific program can be sought only by the model information even if the program specification information is unacquirable. Thus, the handsfree apparatus can resolve a model-dependent constraint corresponding to the model-specific program.

As an optional aspect to the handsfree apparatus, the program specification information is inputted in the phone. In other words, the phone may comprise a program specification information input means for inputting the program specification information.

As explained in the above, Non-patent Document 1 describes a method where the device name of a phone can be designated optionally. The configuration of the aspect of the present disclosure can be achieved by using the existing method as is.

As an optional aspect to the handsfree apparatus, a message output means may be further configured to output a message which requires an input of program specification information when the acquired model information is not included in the database.

Thus, even if a new phone is coupled or connected, it is checked or investigated whether a usable model-specific program corresponding to the program specification information inputted by a user is stored in the database. When having the mode-specific program, the handsfree apparatus can resolve or eliminate a model-dependent constraint corresponding to the model-specific program.

As an optional aspect to the handsfree apparatus, the handsfree apparatus may be coupled with the phone by a Bluetooth communication protocol.

Bluetooth (Bluetooth: registered trademark) is used as a communication interface or communication protocol with the handsfree apparatus (refer to Nonpatent Document 1). The configuration of the aspect of the present disclosure can be achieved by using the existing method as is.

It will be obvious to those skilled in the art that various changes may be made in the above-described embodiments of the present invention. However, the scope of the present invention should be determined by the following claims.

What is claimed is:

1. A handsfree apparatus coupled with a phone and allowing a handsfree phone call via the phone, the handsfree apparatus comprising:

a storage medium including a primary control program and a model-specific program,
the primary control program being stored in a predetermined storage area for enabling the handsfree phone call when coupled with the phone,
the model-specific program being stored separately from the primary control program and operated to resolve a model-dependent constraint by being incorporated in the primary control program, the model-dependent constraint arising when coupled with the phone,
the storage medium further including a database storing (i) phone model information specifying a model of the phone and (ii) program specification information specifying the model-specific program independent of the phone model information,
the database associating each of the phone model information, and the program specification information with the model-specific program;
means for acquiring a device name as information when coupled with a phone, wherein when the device name was previously registered with the phone, the registered device name is enabled to contain a keyword as well as phone model information;
means for retrieving a model-specific program,
(i) when the database previously includes the phone model information contained in the acquired phone information,
the retrieving means retrieving from the storage medium the model-specific program, which is associated with the phone model information contained in the acquired phone information, and
(ii) when the database does not previously include the phone model information contained in the acquired phone information,
the retrieving means regards the keyword, which is other than the phone model information and contained in the acquired phone information, as the program specification information and then retrieves the model-specific program associated with the program specification information as which the keyword contained in the acquired phone information is regarded; and means for executing the retrieved model-specific program by incorporating in the primary control program.

2. The handsfree apparatus according to claim 1, further comprising:

means for registering, in the database, when the phone model information contained in the acquired phone information is not included in the database, the keyword so as to serve as the program specification information, in association with the model-specific program.

3. The handsfree apparatus according to claim 1, wherein the phone is provided with means for inputting for a user to register the device name that is enabled to contain the keyword as well as the phone model information.

4. The handsfree apparatus according to claim 1, further comprising:

means for outputting a message which requires an input of the keyword when the model information contained in the acquired phone information is not included in the database.

5. The handsfree apparatus according to claim 1, being coupled with the phone by a Bluetooth communication protocol.

6. A handsfree system including a handsfree apparatus and a phone coupled with the handsfree apparatus and allowing a handsfree phone call, the phone comprising:

means for inputting for a user to register phone information that is enabled to contain program specification information as well as phone model information, the program specification information specifying model-specific program to resolve a model-dependent constraint of the phone, the handsfree apparatus comprising:

a storage medium having a primary control program, a model-specific program, and a database, the primary control program enabling the handsfree phone call when coupled with the phone, the model-specific program being operated to resolve a model-dependent constraint by being incorporated in the primary control program, the model-dependent constraint arising in the handsfree apparatus when coupled with the phone, the database storing (i) phone model information to specify a model of the phone and (ii) program specification information to specify the model-specific program independent of the phone model information, each of which being associated with the model-specific program, means for acquiring the phone information when coupled with a phone, wherein when the phone information was previously registered with the phone, the registered phone information contains the phone model information and the program specification information;

means for retrieving a model-specific program from the storage medium, (i) the model-specific program associated with the phone model information being contained in the acquired phone information when the database previously includes the model-specific program associated with the phone model information contained in the acquired phone information, and (ii) the model-specific program associated with the program specification information being contained in the acquired phone information when the database does not previously include the model-specific program associated with the phone model information contained in the acquired phone information; and means for executing the retrieved model-specific program by incorporating in the primary control program.

7. A method for resolving model-related constraint in a handsfree system including a handsfree apparatus and a phone coupled with the handsfree apparatus for a handsfree phone call, the handsfree apparatus having a primary control program, a model-specific program, and a database, the primary control program enabling the handsfree phone call, the model-specific program being operated to resolve a model-dependent constraint by being incorporated in the primary control program, the model-dependent constraint arising in the handsfree apparatus when coupled with the phone, the database storing (i) phone model information to specify a model of the phone and (ii) program specification information to specify the model-specific program independent of the phone model information, each of which being associated with the model-specific program, the method comprising:

registering phone information with the phone, the registered phone information being enabled to contain program specification information as well as phone model information;

acquiring the phone information containing the phone model information and the program specification information from the phone coupled with the handsfree apparatus;

retrieving from the handsfree apparatus (i) the model-specific program associated with the phone model information contained in the acquired phone information when the database previously includes the phone model information contained in the acquired phone information, and (ii) the model-specific program associated with the program specification information contained in the acquired phone information when the database does not previously include the phone model information contained in the acquired phone information; and executing the retrieved model-specific program by incorporating in the primary control program.

* * * * *